(12) United States Patent  
Hosomizo

(10) Patent No.: US 11,893,294 B2  
(45) Date of Patent: Feb. 6, 2024

(54) NON-TRANSITORY COMPUTER-READABLE STORAGE MEDIUM AND PRINTING SYSTEM

(71) Applicant: BROTHER KOGYO KABUSHIKI KAISHA, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/057,412

(22) Filed: Nov. 21, 2022

(65) Prior Publication Data

US 2023/0168850 A1 Jun. 1, 2023

(30) Foreign Application Priority Data

Nov. 29, 2021 (JP) .................................. 2021-193023

(51) Int. Cl.
G06F 3/12 (2006.01)

(52) U.S. Cl.
CPC .......... *G06F 3/1253* (2013.01); *G06F 3/1232* (2013.01); *G06F 3/1211* (2013.01)

(58) Field of Classification Search
CPC .... G06F 3/1253; G06F 3/1232; G06F 3/1211; G06F 3/12; G06F 3/1205; G06F 3/1208;
(Continued)

(56) References Cited

U.S. PATENT DOCUMENTS

2014/0055799 A1* 2/2014 Nakagawa ............ G06F 3/1205  
358/1.13  
2020/0341708 A1* 10/2020 Kaneda ................. G06F 3/1205  
(Continued)

FOREIGN PATENT DOCUMENTS

JP  2001-195213 A  7/2001  
JP  2006-180391 A  7/2006  
(Continued)

OTHER PUBLICATIONS

International Search Report and Written Opinion dated Jan. 24, 2023 of the International Searching Authority issued in the PCT application No. PCT/JP2022/043135 together with English translations.

*Primary Examiner* — John R Wallace  
(74) *Attorney, Agent, or Firm* — Scully, Scott, Murphy & Presser, PC

(57) ABSTRACT

A printing system includes a printer and an information processing apparatus which communicates with the printer. The information processing apparatus transmits a printing capability information request to the printer. The printer transmits the printing capability information of the printer to the information processing apparatus, in response to the printing capability information request. The information processing apparatus is configured to receive the printing capability information transmitted from the printer, receive an input of a print quality setting corresponding to the printing capability information, determine a corresponding data correction manner based on a receiving result in the receiving of the input of the print quality setting, acquire intermediate print data from a general-purpose printing program incorporated in an operating system of the information processing apparatus, generate, using the intermediate print data, print output data based on the data correction manner, and transmit the print output data to the printer.

8 Claims, 7 Drawing Sheets

(58) Field of Classification Search
CPC .... G06F 3/1244; G06F 3/1247; G06F 3/1256; G06F 3/1285
See application file for complete search history.

(56) References Cited

U.S. PATENT DOCUMENTS

| | | | |
|---|---|---|---|
| 2021/0216256 A1 | 7/2021 | Hosomizo | |
| 2021/2018864 | 7/2021 | Kunimatsu | |
| 2021/0334050 A1* | 10/2021 | Kohata | G06F 3/1257 |
| 2022/0011990 A1 | 1/2022 | Kunimatsu | |
| 2023/0061074 A1* | 3/2023 | Shiohara | G06F 3/1205 |

FOREIGN PATENT DOCUMENTS

| | | |
|---|---|---|
| JP | 2011-180721 A | 9/2011 |
| JP | 2020-107241 A | 7/2020 |
| JP | 2020-166363 A | 10/2020 |
| JP | 2021-056756 A | 4/2021 |
| JP | 2021-093081 A | 6/2021 |

* cited by examiner

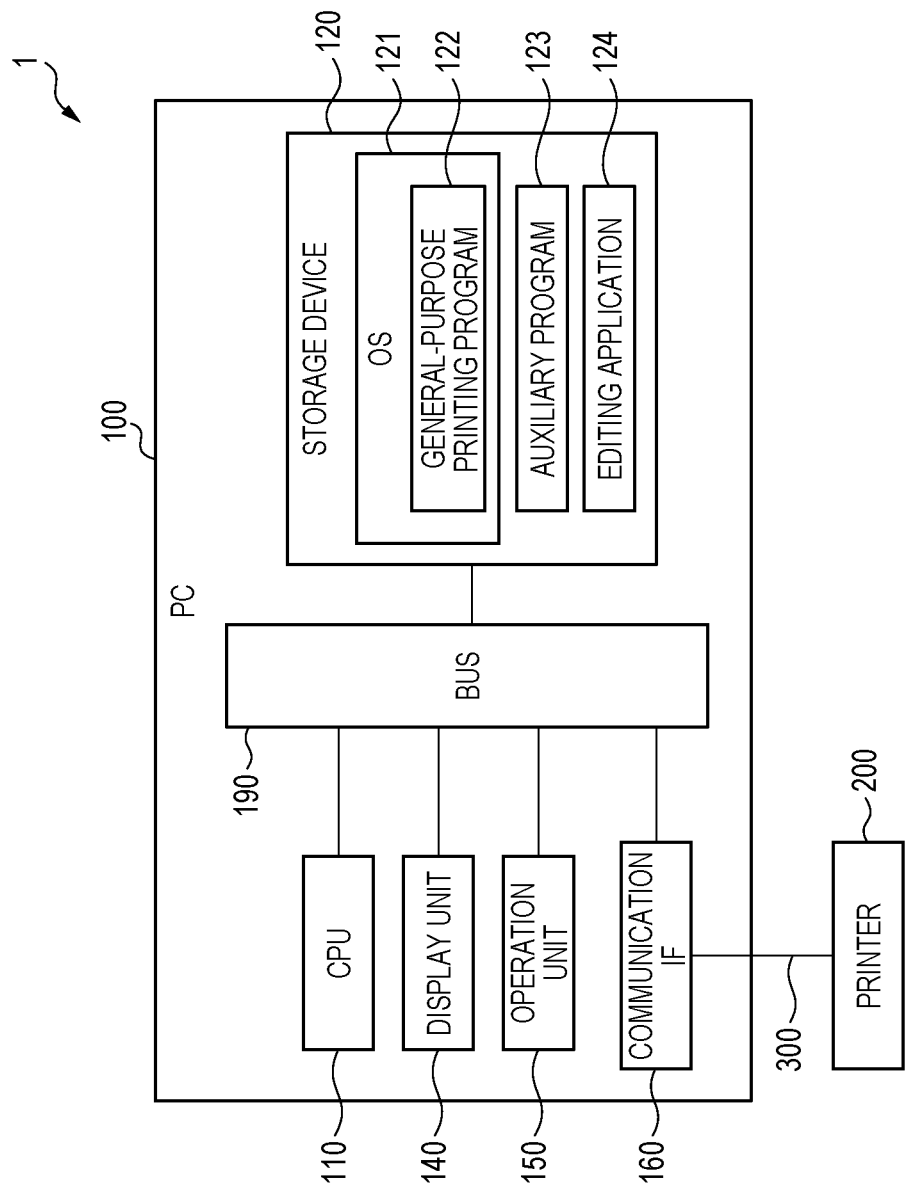

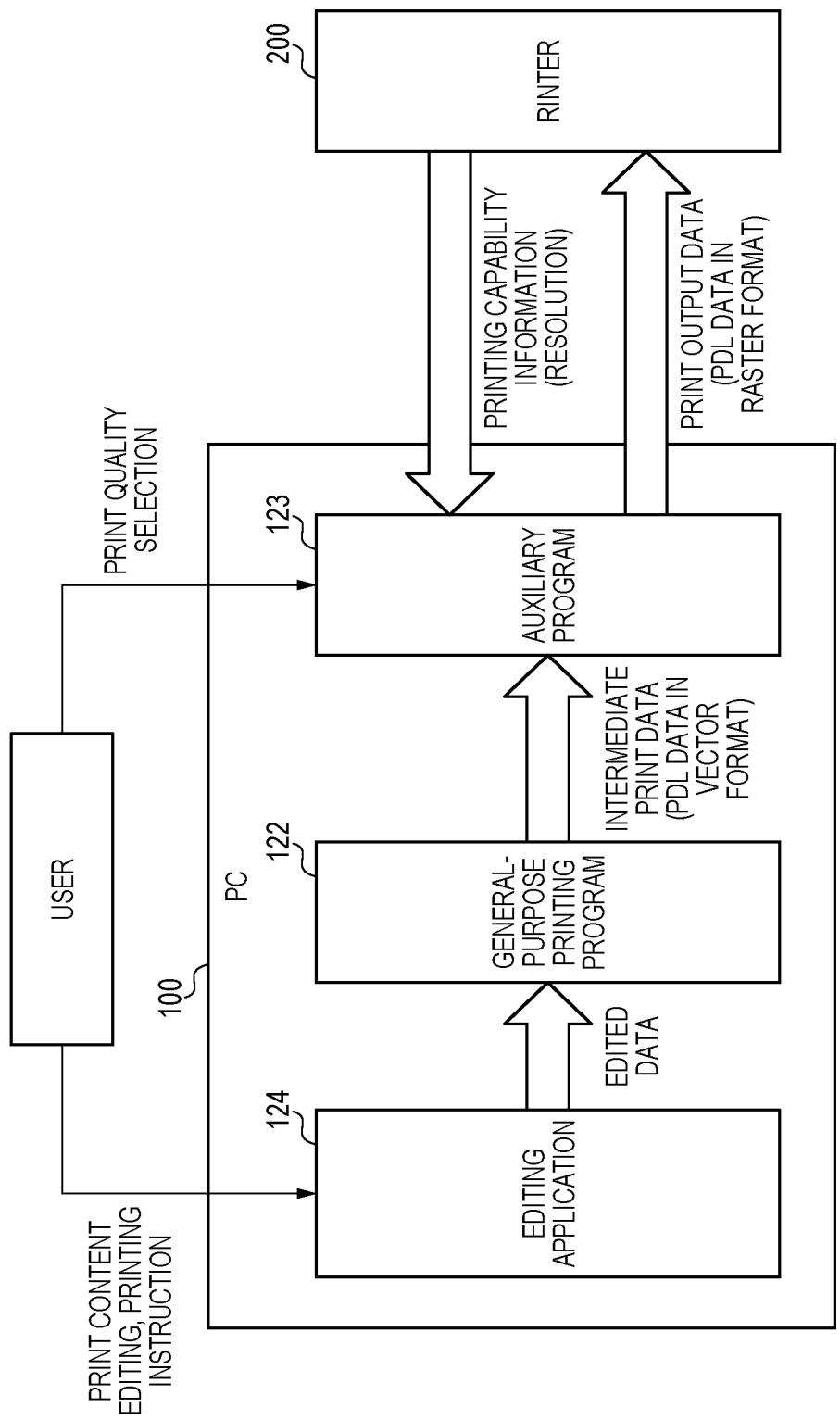

FIG. 3A

CAPABILITY SETTING CORRELATION TABLE 1

| PRINTING CAPABILITY INFORMATION (RESOLUTION) | PRINT QUALITY SETTING |
|---|---|
| 1200 | HIGH |
| 600 | NORMAL |
| 300 | DRAFT |

FIG. 3B

CAPABILITY SETTING CORRELATION TABLE 2

| PRINTING CAPABILITY INFORMATION (RESOLUTION) | PRINT QUALITY SETTING |
|---|---|
| 600 | HIGH |
| 400 | NORMAL |
| 200 | DRAFT |

FIG. 3C

CAPABILITY SETTING CORRELATION TABLE 3

| PRINTING CAPABILITY INFORMATION (RESOLUTION) | PRINT QUALITY SETTING |
|---|---|
| 400 | HIGH |
| 300 | NORMAL |
| 150 | DRAFT |

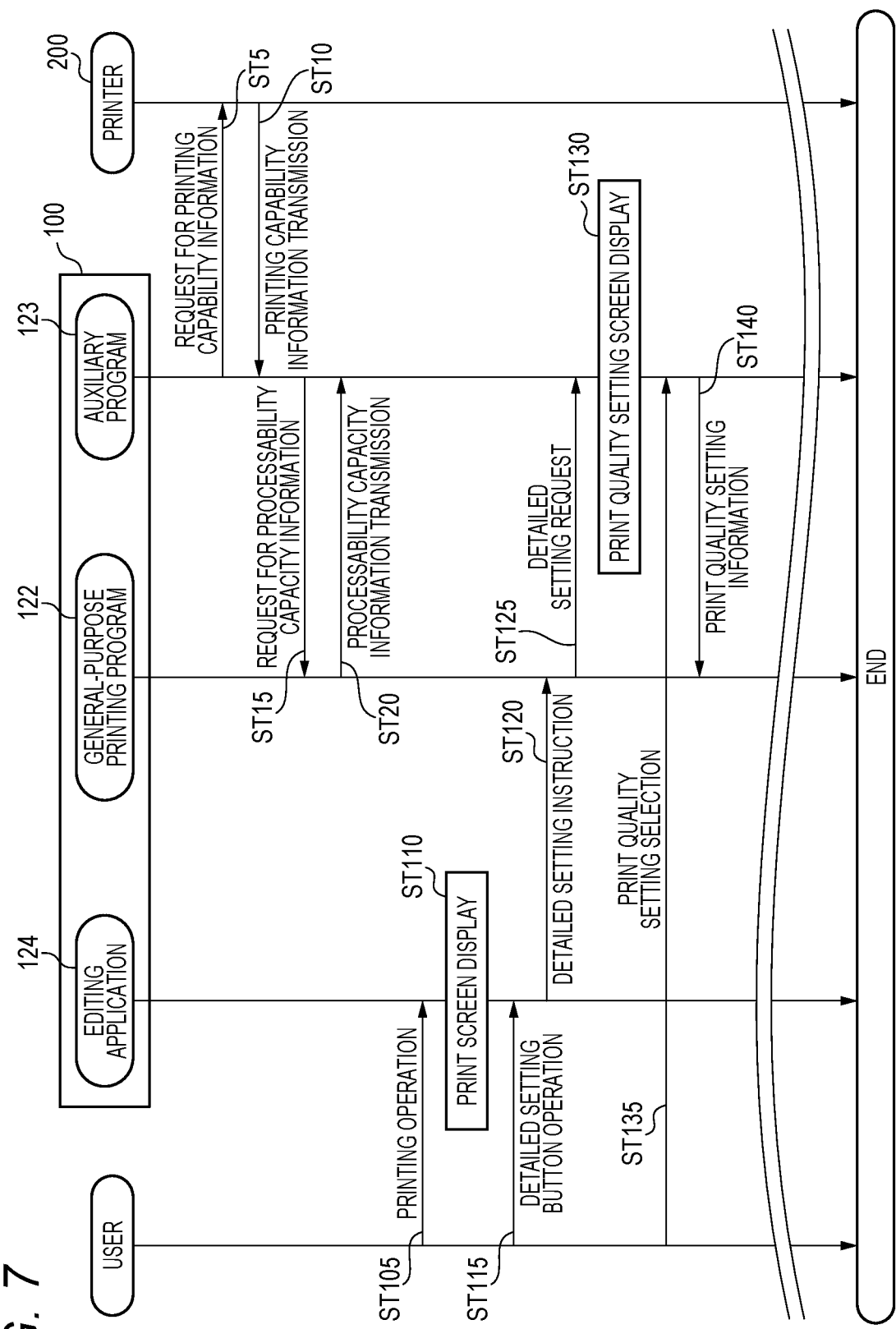

NON-TRANSITORY COMPUTER-READABLE STORAGE MEDIUM AND PRINTING SYSTEM

REFERENCE TO RELATED APPLICATIONS

This application claims priority from Japanese Patent Application No. 2021-193023 filed on Nov. 29, 2021. The entire content of the priority application is incorporated herein by reference.

BACKGROUND ART

For a printer driver installed in an information processing apparatus which is connected to a printer, a technology of performing processing for a resolution relating to an image quality of the printer is known.

DESCRIPTION

In recent years, for an information processing apparatus, a driverless technology of making it possible to execute printing without using a printer driver corresponding to each printer model is being proposed. In such a driverless environment, an operating system (hereinafter, appropriately, simply referred to as "OS") of the information processing apparatus has a general-purpose printing program, and data generated using the general-purpose printing program is transmitted to the printer for printing.

However, when performing printing only with data generated using the general-purpose printing program as described above, it is difficult to achieve a desired print quality because the printer cannot obtain print data suitable for each printer.

If a printer is equipped with an advanced function that realizes a desired print quality based on the print data generated by the general-purpose printing program, improvement can be made to some extent. However, the processing burden on the printer side increases, and the cost increases.

An object of the present disclosure is to provide a non-transitory computer-readable storage medium storing a support program and a printing system capable of obtaining a desired print quality while suppressing an increase in cost, even in a case where driverless printing is performed with executing a general-purpose printing program.

A first aspect of the present disclosure is a non-transitory computer-readable storage medium storing a support program executable by a computer of an information processing apparatus and used for printing using a printer connected to the information processing apparatus, the support program including instructions that, when executed by the computer, cause the computer to perform: acquiring, from the printer, printing capability information of the printer; receiving an input of a print quality setting corresponding to the printing capability information; determining a corresponding data correction manner, based on a receiving result in the receiving of the input of the print quality setting; acquiring intermediate print data from a general-purpose printing program incorporated in an operating system of the information processing apparatus; generating, using the intermediate print data, print output data to be output to the printer based on the data correction manner; and outputting the print output data to be transmitted from the information processing apparatus to the printer as a destination.

The support program of the present disclosure includes the instructions that cause the computer of the information processing apparatus to perform the acquiring of the printing capability information of the printer, the receiving of the input of the print quality setting, the determining of the corresponding data correction manner, the acquiring of the intermediate print data, the correcting of the intermediate print data, the generating of the print output data, and the outputting of the print output data. The support program is configured to acquire the printing capability information, which is capability information of the printer actually connected to the information processing apparatus, in the acquiring of the printing capability information, to receive the print quality setting corresponding to the printing capability information from a user of the information processing apparatus in the receiving of the input of the print quality setting, and to determine the corresponding data correction manner, based on the receiving result, in the determining of the corresponding data correction manner.

Thereafter, the support program is configured to acquire, in the acquiring of the intermediate print data, the intermediate print data from the general-purpose printing program incorporated in the operating system of the information processing apparatus, to generate the print output data to be output to the printer using the intermediate print data, based on the determined data correction manner, and to output the print output data in the outputting of the print output data.

In this way, in the case where a driverless printing is performed with executing the general-purpose printing program, the support program of the present disclosure can perform the original processing of generating the print output data, which can be directly processed by the printer according to a content of the print quality setting, from the intermediate print data acquired from the general-purpose printing program. In addition, the support program is configured to determine the data correction manner by reflecting the printing capability information specific to the printer model and the input receiving result about a print quality desired by the user, before generating the print output data, and then to generate the print output data based on the data correction manner. All of the above processing is performed on the information processing apparatus side, there is no processing burden on the printer side, and the increase in cost can be suppressed.

According to the present disclosure, the desired print quality can be obtained while suppressing the increase in cost, even in the case where the driverless printing is performed with executing the general-purpose printing program.

A second aspect of the present disclosure is a printing system having: a printer; and an information processing apparatus having a controller and a communication interface that communicates with the printer, in which the controller of the information processing apparatus is configured to be executable with an instruction which causes the information processing apparatus to transmit a printing capability information request for requesting printing capability information of the printer to the printer, in which the printer is configured to be executable with an instruction which causes the printer to transmit the printing capability information of the printer to the information processing apparatus, in response to the printing capability information request, and in which the controller of the information processing apparatus is configured to be further executable with instructions which cause the information processing apparatus to perform: receiving and acquiring the printing capability information transmitted from the printer; receiving an input of a print quality setting corresponding to the printing capability information; determining a corresponding data correction manner, based on a receiving result in the receiving of the input of the print quality setting; acquiring intermediate print data from a general-purpose printing program incorporated in an operating system of the information processing apparatus; generating print output data to be output to the printer based on the data correction manner; and transmitting the print output data to the printer.

According to the present disclosure, the desired print quality can be obtained while suppressing the increase in cost, even in the case where the driverless printing is performed with executing the general-purpose printing program.

FIG. 1 is a functional block diagram showing an overall schematic configuration of a printing system according to an embodiment of the present disclosure.

FIG. 2 illustrates data that is handled by various programs, and a print quality setting.

FIGS. 3A to 3C are diagrams schematically showing examples of a plurality of capability setting correlation tables stored in a storage device.

FIG. 7 is a sequence flow when reflecting processability capability information of the general-purpose printing program.

Figure 4:
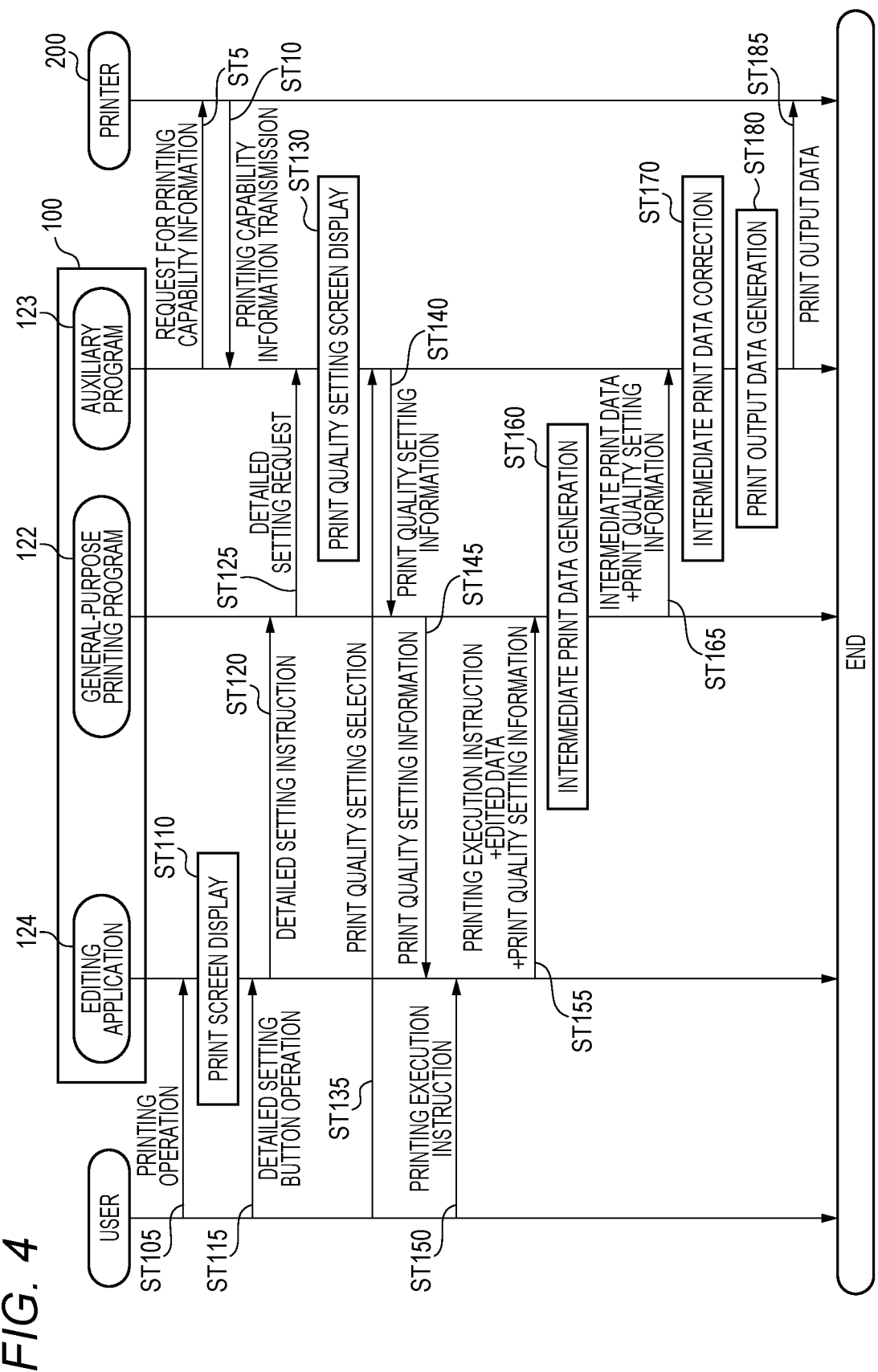
FIG. 4 is a sequence flow showing processing that is executed by a user, an editing application, a general-purpose printing program, an auxiliary program, and a printer in the embodiment.

Embodiments of the present disclosure will be described with reference to the drawings.

FIG. 1 shows a printing system to which a support program according to an embodiment of the present disclosure is applied. The present embodiment is an embodiment of a printing system 1 configured to cause a printer to print edited data that has been edited with an editing application on a general-purpose personal computer by a user.

1: Outline of Printing System

In FIG. 1, the printing system 1 includes a general-purpose personal computer 100 and a printer 200. The general-purpose personal computer 100 and the printer 200 are connected via a cable 300 and can communicate with each other.

<1-1: General-Purpose Personal Computer>

The general-purpose personal computer 100 (hereinafter referred to as PC 100) includes a CPU 110, a storage device 120, a display unit 140, an operation unit 150, and a communication interface 160 (abbreviated as "communication IF" in the drawing). The CPU 110, the storage device 120, the display unit 140, the operation unit 150, and the communication interface 160 are mutually connected via a bus 190. Note that, the general-purpose personal computer 100 is an example of the information processing apparatus.

The storage device 120 includes, for example, a ROM, a RAM, and a non-volatile memory, and is configured to store an OS 121 including a general-purpose printing program 122, an auxiliary program 123, and an editing application 124. The auxiliary program 123 is an example of the support program, and the editing application 124 is an example of the editing application program. The OS 121 is, for example, system software responsible for operations of the PC 100, such as Microsoft Windows (registered trademark), MacOS (registered trademark) or Linux (registered trademark). Note that, in the storage device 120, in addition to the ones shown in the drawing, edited data edited by the editing application 124, various data including information on the connected printer 200, and various programs such as a browser are stored. The storage device 120 may be, for example, a non-transitory computer-readable storage medium (tangible or non-tangible). Note that, the general-purpose printing program 122, the auxiliary program 123, the editing application 124, and data handled by these programs will be described in detail later.

The CPU 110 is a device configured to execute a program and to perform data processing. The CPU 110 is configured to execute various programs stored in the storage device 120, thereby executing various processing shown in FIG. 4 and the like described later, including data communication to the printer 200 connected via the cable 300. Note that, the auxiliary program 123 and the like in the storage device 120 and the CPU 110 configured to execute the same are an example of the controller of the information processing apparatus. In addition, the CPU 110 is an example of the computer and an example of the processor.

The display unit 140 and the operation unit 150 are hardware for performing various displays and receiving a user's instruction input, and may be, for example, a touch panel having both a display function and an input receiving function, or a combination of a display having a display function and a keyboard, a mouse and the like having an input receiving function.

The communication interface 160 is, for example, a wired LAN interface for communicating with the printer 200 via the cable 300, a wireless LAN interface, a USB interface, or the like.

<1-2: Printer>

The printer 200 has a CPU, a memory, a printing unit, and a communication interface, which are not particularly shown. Among them, the CPU is configured to transmit and receive various types of information to and from the PC 100 via the cable 300, and to cause the printing unit to print an image on a sheet in a predetermined manner, based on print output data received from the PC 100. Note that, the printer 200 is an example of a printing apparatus.

2: Details of Data Handled by Various Programs and Print Quality Setting

Next, with reference to FIG. 2, in an example of the present embodiment, details of data that is handled by various programs and a print quality setting are described.

First, the editing application 124 in the example of the present embodiment is an application program for editing and printing out document data, image data, table calculation data, and the like. As the specific editing application 124, for example, Microsoft's Word (registered trademark), Excel (registered trademark), and Power Point (registered trademark), other vendor-made applications for outputting data, and the like are assumed. In addition to data display on the display unit 140, the editing application 124 is also configured to receive an editing operation of data contents from a user via the operation unit 150 and a printing instruction for causing the printer 200 to print the edited data contents.

The general-purpose printing program 122 in the example of the present embodiment is a printing program equipped as standard in the OS 121, which is an operating system of the PC 100, and is commonly used by printer vendors. The general-purpose printing program 122 can generate and output print output data to the printer 200 without using a printer vendor's proprietary printer driver specialized for print control of the printer 200 connected to the PC 100, and constitutes a so-called driverless environment. However, when performing processing only with the general-purpose printing program 122, printing by its own quality setting cannot be performed.

In the present embodiment, as shown in FIG. 2, the auxiliary program 123 corresponding to the printer 200 is installed and used in the PC 100 before starting a printing use. The auxiliary program 123 is configured to acquire, as intermediate print data, PDL data in vector format (XPS format as an example) from the general-purpose printing program 122, and to convert each entire print page to bitmap data in raster format by rasterizing the PDL data, based on a command and a parameter contained in the PDL data and according to a unique quality setting corresponding to the printer 200 or a printer vendor. Then, the auxiliary program 123 is configured to add header information including appropriate supplementary information to the bitmap data, to generate, as print output data, PDL data in raster format (for example, data conforming to PWGRaster standards) and to output the generated data to the printer 200.

Depending on the model of the printer 200 used connected to the PC 100 or depending on whether an optional memory is mounted even when the printer is the same model, there is a difference in printing capability such as a resolution of printing. For this reason, in the present embodiment, the auxiliary program 123 is configured to acquire in advance, from the printer 200 connected thereto, printing capability information including a resolution of the printer, and to generate the PDL data in raster format, which is print output data, by executing the rasterization processing described above, based on a setting value selected from a resolution and the like that can be selected based on the printing capability information. Note that, information on the resolution included in the printing capability information is an example of the resolution information.

However, the resolution is difficult for a user to understand, and it is difficult to determine which resolution to select depending on the user. In addition, a quality of printing is not determined only by the resolution. In contrast, the auxiliary program 123 of the present embodiment is configured to cause the user to arbitrarily select and set which print quality based on the printing capability information acquired from the printer 200 is used for performing sheet printing. As a specific example, with respect to a plurality of models of the printers 200 that can be supported by the auxiliary program 123, it is assumed that each model can perform printing with any one of the resolutions 1200, 600, 400, 300, 200 and 150 (dpi) as the printing capability information. As shown in FIGS. 3A to 3C, the auxiliary program 123 stores a capability setting correlation table, in which level names of print quality settings of "HIGH", "NORMAL", and "DRAFT" are assigned to the resolutions included in the printing capability information acquired from the printer 200, in the storage device 120 in association with the printer 200. Note that, the capability setting correlation table is an example of the correlation between the printing capability information and the print quality setting that can be received in the receiving of the input of the print quality setting, and the storage device 120 is an example of the storage unit.

When causing the user to select the print quality setting, the auxiliary program 123 displays the level names of the print quality setting, not numerical values of the resolution, for the user selecting the same, based on the stored capability setting correlation table described above. Then, at the time of the rasterization processing by the auxiliary program 123 described above, the auxiliary program 123 is configured to determine, as a data correction manner, a resolution or the like in the print quality corresponding to the level name selected by the user, and to perform the rasterization processing of bitmap data so as to perform correction with the resolution. Note that, the resolution determined as the data correction manner is an example of the data resolution and the print resolution.

3: Control Procedure

An example of a control procedure for implementing a processing method of the auxiliary program 123 in the present embodiment will be described with reference to a sequence chart of FIG. 4. Note that, in this example of the control procedure, the above-described driverless environment is premised, and the description will be made on the assumption that printing is performed on a sheet by the printer 200. A case in which the user instructs the printer 200 to print the sheet according to the print quality arbitrarily set with respect to the resolution and the like will be described. In addition, the processing of each of the editing application 124, the general-purpose printing program 122, and the auxiliary program 123 shown in the drawing is executed in parallel by appropriate time division interruption or appropriate core allocation by the CPU 110 of the PC 100.

First, when the OS 121 recognizes that the printer 200 is connected to the PC 100, the auxiliary program 123 requests the printing capability information from the printer 200 in ST5, and the printer 200 sends the printing capability information back to the auxiliary program 123 in ST10. Thereby, the auxiliary program 123 can acquire the printing capability information regarding the print quality such as a resolution of the printer 200 in advance before actually performing processing relating to sheet printing in the printer 200. Note that, the procedure of ST5 is an example of the transmitting of the printing capability information request, the procedure of ST10 is an example of the transmitting of the printing capability information and the receiving and acquiring of the printing capability information, and the procedures of ST5 and ST10 are an example of the acquiring of the printing capability information of the printer.

Then, when the user edits a predetermined print content with the editing application 124, an operation for instructing printing (specifically, a selection operation of a "Print" menu, and the like) is executed for the editing application 124 in ST105. Thereby, in ST110, the editing application 124 displays, on the display unit 140, a print screen for receiving a user's instruction operation regarding printing using general-purpose setting items that can be handled by the general-purpose printing program 122, such as selection of a sheet size, selection of print copies, and selection of pages to be printed.

In response to this, when the user operates a detailed setting button in the print screen in ST115, the editing application 124 transmits a detailed setting instruction to the general-purpose printing program 122 in ST120, and the general-purpose printing program 122 transmits a detailed setting request to the auxiliary program 123 corresponding to the selected printer 200 in ST125.

Thereby, in ST130, the auxiliary program 123 refers to the capability setting correlation table corresponding to the resolution and the like included in the printing capability information acquired in ST10, and displays a print quality setting screen in which the level names of the print quality setting of "HIGH", "NORMAL" and "DRAFT" are listed, as a detailed setting screen. Note that, the procedure of ST130 is an example of the displaying of the print quality setting. In addition, the procedures of ST5 and ST10 for the auxiliary program 123 to acquire the printing capability information of the printer 200 are not limited to the timing immediately after the connection of the printer 200 as described above, but may be performed at the time when the detailed setting request in ST125 is received.

Thereby, the user can make the print quality setting regarding the resolution and the like in sheet printing by selecting the level name of the print quality setting from "HIGH", "NORMAL", and "DRAFT" on the print quality setting screen in ST135. In addition, at this time, the resolution and the like corresponding to the level name selected by the user are determined as a data correction manner at the time of correcting bitmap data in rasterization processing, which will be described later. Note that, the procedure of ST135 is an example of the receiving of the input of the print quality setting and the determining of the corresponding data correction manner.

The print quality setting information set in this way is transmitted to the editing application 124 in ST145 by relaying the general-purpose printing program 122 in ST140, so that a final printing instruction waiting state is set. Note that, the procedure of ST140 is an example of the notifying of the general-purpose printing program of the receiving result. In this printing instruction waiting state, when the user executes an operation of instructing execution of printing (specifically, an operation of pressing a "Print" button, or the like) on the editing application 124 in ST150, the editing application 124 transmits information on the printing execution instruction, edited data that is a print content edited by the editing application 124, and print quality setting information to the general-purpose printing program 122 in ST155.

Upon receiving this, the general-purpose printing program 122 generates intermediate print data in ST160. The intermediate print data becomes PDL data in which the print content of the received edited data is described with the page description language (XPS, as an example) of the above-described vector format. Then, the general-purpose printing program 122 transmits the intermediate print data and the print quality setting information in ST165, and the auxiliary program 123 acquires the same. Note that, the procedure of ST165 is an example of the acquiring of the intermediate print data.

Upon receiving this, the auxiliary program 123 performs rasterization processing on the intermediate print data, which is PDL data in vector format, thereby converting the intermediate print data to bitmap data in raster format in ST170. At the time of the rasterization processing, the intermediate print data is corrected with the resolution corresponding to the content of the received print quality setting information, and is thus made as corrected intermediate print data. Specifically, with reference to the capability setting correlation table selected in ST130, the auxiliary program 123 performs rasterization processing of the bitmap data for correction with the resolution corresponding to any one of the level names of "HIGH", "NORMAL", and "DRAFT" selected by the user in ST135, or the like. Note that, the procedure of ST170 is an example of the correcting of the intermediate print data.

The corrected intermediate print data obtained in this way is still simple bitmap data. For this reason, additionally, the auxiliary program 123 adds header information including appropriate supplementary information to the corrected intermediate print data in ST180, thereby generating PDL data in raster format (PWGRaster data, in this example) as print output data that can be directly handled by the printer 200. Then, the auxiliary program 123 outputs the print output data to the printer 200 in next ST185, so that page printing can be performed with the resolution selected by the user among the printing capabilities of the printer 200. Note that, the procedures of ST170 and ST180 are an example of the generating of the print output data, and the procedure of ST185 is an example of the outputting of the print output data and the transmitting of the print output data.

4: Effect of Present Embodiment

As described above, in the printing system 1 of the present embodiment, the auxiliary program 123 executes the procedures of ST5 and ST10, the procedure of ST135, the procedure of ST165, the procedures of ST170 and ST180, and the procedure of ST185. The auxiliary program 123 acquires the printing capability information of the printer 200 actually connected to the PC 100 in the procedures of ST5 and ST10, and receives the print quality setting corresponding to the printing capability information from the user and determines the corresponding data correction manner, based on the receiving result, in the procedure of ST135.

Thereafter, the auxiliary program 123 acquires the intermediate print data from the general-purpose printing program 122 incorporated in advance in the OS 121 of the PC 100 in the procedure of ST165, generates the print output data to be output to the printer 200 based on the determined data correction manner, in the procedures of ST170 and ST180, and outputs the print output data to the printer 200 in the procedure of ST185.

In this way, when executing driverless printing based on the general-purpose printing program 122, the auxiliary program 123 of the present embodiment can execute the original processing of generating the print output data, which can be directly processed by the printer 200 according to the content of the print quality setting, from the intermediate print data acquired from the general-purpose printing program 122. In addition, the auxiliary program 123 determines the data correction manner by reflecting the printing capability information specific to the model of the printer 200 and the input receiving result about the print quality desired by the user, before generating the print output data, and then generates the print output data based on the data correction manner. All of the above processing is executed on the PC 100 side, there is no processing burden on the printer 200 side, and the increase in cost can be suppressed.

According to the present embodiment, the desired print quality can be obtained while suppressing the increase in cost, even in the case where the driverless printing is performed with executing the general-purpose printing program 122.

Further, in the present embodiment, in particular, the CPU 110 and the auxiliary program 123 further execute the procedure of ST170 of correcting the intermediate print data based on the data correction manner and making the corrected intermediate print data, and in the procedure of ST180, the print output data to be output to the printer 200 is generated based on the corrected intermediate print data. In this way, by performing the processing with the page description language, it is easier to perform the processing and to reduce the increase in processing time, as compared to raster data.

Further, in the present embodiment, in particular, in the state in which the auxiliary program 123 displays, on the display unit 140, the print quality setting corresponding to the printing capability information of the printer 200 by executing the procedure of ST130 as, the auxiliary program 123 receives the input of the print quality setting in the procedure of ST135. Then, the auxiliary program 123 is caused to execute the procedure of ST140 of notifying the general-purpose printing program 122 of the receiving result in the procedure of ST135, and acquires the intermediate print data generated in the general-purpose printing program 122 according to the receiving result in the procedure of ST in the procedure of ST165.

Thereby, the user can input the print quality setting while visually checking the print quality setting corresponding to the printing capability information of the printer 200 actually connected to the PC 100. Then, since the auxiliary program 123 acquires the intermediate print data corresponding to the receiving result in the procedure of ST135 described above from the general-purpose printing program 122 and can generate the print output data based on the intermediate print data, it is possible to meet the user's demand for print quality.

Further, in the present embodiment, in particular, the PC 100 has the storage device 120 for storing at least one capability setting correlation table indicating a correlation between the printing capability information of the printer 200 and the print quality setting received in the procedure of ST135. In the procedure of ST135, the auxiliary program 123 refers to the capability setting correlation table stored in the storage device 120 with respect to the receiving result regarding the print quality setting from the user, and determines the corresponding data correction manner.

Thereby, even when a plurality of models of the printers 200 having different printing capability information can be connected to the PC 100, it is possible to enable general-purpose correspondence by preparing in advance a correlation table of the printing capability information and the receiving result of the print quality setting, for each of the plurality of models.

Further, in the present embodiment, particularly, the printing capability information is the print resolution information of the printer 200, and in the procedure of ST135, the auxiliary program 123 determines the data resolution corresponding to the print resolution information, as the data correction manner, based on the receiving result of the print quality setting. Then, in the procedure of ST165, the auxiliary program 123 acquires the intermediate print data, which has been generated in vector format by the general-purpose printing program 122 according to the receiving result of the print quality setting notified by the procedure of ST140. In response to this, the auxiliary program 123 converts the acquired intermediate print data in vector format to a raster format in the procedure of ST170. At this time, the auxiliary program 123 corrects the intermediate print data with the print resolution corresponding to the data resolution, which is the data correction manner, to make the corrected intermediate print data.

Thereby, with respect to the print resolution of the model of the printer 200 actually connected to the PC 100, the data resolution arbitrarily set and input by the user can be determined as a data correction manner. Then, when converting the intermediate print data in vector format acquired from the general-purpose printing program 122 to a raster format suitable for processing in the printer 200, the auxiliary program 123 can correct the intermediate print data with a print resolution reflecting the printing capability of the printer 200 and the user's setting, and the like.

Further, in the present embodiment, in particular, the auxiliary program 123 acquires, as the intermediate print data, the data that has been converted to the vector format from the edited data, which has been edited by the predetermined editing application 124 incorporated in advance in the OS 121 of the PC 100, by the general-purpose printing program 122. Thereby, it is possible to apply, as a print object, the edited data edited by the general editing application 124 in a general-purpose manner, and to improve the print quality.

5: MODIFIED EMBODIMENTS

Note that, the present disclosure is not limited to the above embodiment, and can be diversely changed without departing from the gist and technical spirit of the present disclosure. The modified embodiments will be sequentially described. The parts equivalent to the above embodiment are denoted with the same reference signs, and the descriptions thereof are appropriately omitted or simplified.

Modified Embodiment 1: The Case of Determining Data Correction Manner, Including Image Processing Manner In the example of the above embodiment, the case where the data resolution corresponding to the print resolution is applied as the data correction manner when the auxiliary program 123 performs rasterization processing on the intermediate print data in vector format has been described. On the other hand, in addition to this, an image processing manner such as blurring processing and edge enhancement processing may also be determined as the data correction manner.

In this case, for example, at the time of the rasterization processing, the correction is performed with the print resolution corresponding to the print quality setting set by the user, and correction of the image processing, which is particularly necessary only when the print quality setting is relatively high such as "HIGH", may also be performed together. In addition, as a processing manner when performing the correction in such image processing, a manner of the image processing each suitable for each of areas in which print contents are different may be determined. Specifically, when the print quality setting is, for example, "HIGH", blurring processing, which is especially required for an image area, and edge enhancement processing, which is especially required for a character area, may be determined as the image processing manner, respectively.

Figure 5:
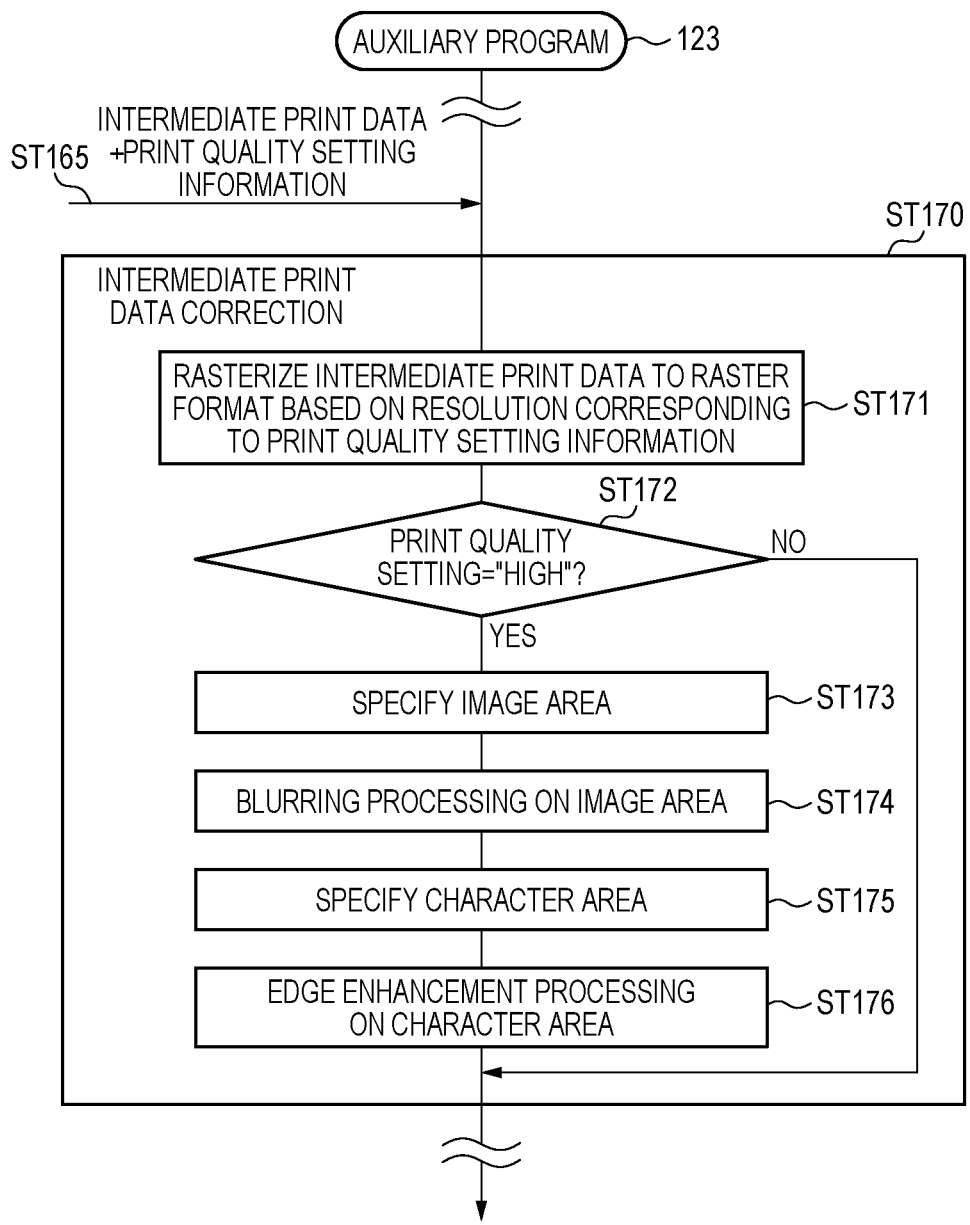
FIG. 5 is a flow showing an internal procedure of ST170 when image processing is also included as a manner of correction, together with a print resolution.

In order to implement the data correction method including the correction manner of the image processing as described above, the procedure of ST170 that is executed by the auxiliary program 123 may be executed in an internal procedure as shown in FIG. 5, for example. First, after ST165 in which the intermediate print data in vector format and the print quality setting information are received from the general-purpose printing program 122, the auxiliary program 123 rasterizes the intermediate print data to a raster format with a resolution corresponding to the print quality setting information in ST171. Thereafter, the auxiliary program 123 determines whether the content of the print quality setting information is "HIGH" in ST172. When the content of the print quality setting information is "NORMAL" or "DRAFT" other than "HIGH", the determination of S172 is not satisfied (ST172: NO), so that the auxiliary program 123 ends the procedure of ST170, as it is, and proceeds to next step ST180 (not shown). On the other hand, when the content of the print quality setting information is "HIGH", the determination of S172 is satisfied (ST172: YES), and the auxiliary program 123 proceeds to next ST173.

The auxiliary program 123 specifies a range of an image area in the rasterized data in ST173, and performs blurring processing on the image area in ST174. Next, the auxiliary program 123 specifies a range of a character area in the rasterized data in ST175, and performs edge enhancement processing on the character area in ST176. Note that, for the specific processing, the blurring processing and the edge enhancement processing described above on the image area or the character area, a known method such as raster scan or predetermined matrix processing may be used, and therefore, details thereof are omitted. Then, the auxiliary program 123 ends the procedure of ST170, and proceeds to next ST180 (not shown).

In this way, in the present modified embodiment, the auxiliary program 123 also determines the image processing manner corresponding to the receiving result in the procedure of ST135, as the data correction manner. Thereby, the data content of the intermediate print data acquired from the general-purpose printing program 122 can be corrected in the image processing corresponding to the print quality setting received from the user, and various print quality improvements become possible.

Further, in the present modified embodiment, in particular, the auxiliary program 123 switches and determines the image processing manner so as to apply either the blurring processing (processing suitable for a photographic image and the like) or the edge enhancement processing (processing suitable for a character image and the like), according to the receiving result in the procedure of ST135. Specifically, when the receiving result is a result corresponding to a relatively high print quality setting, the auxiliary program 123 determines, as the image processing manner, the blurring processing for the image area in the intermediate print data, and determines, as the image processing manner, the edge enhancement processing for the character area in the intermediate print data.

Thereby, when the intermediate print data has a relatively high resolution, from the receiving result of the print quality setting, the auxiliary program 123 corrects an image area such as a photograph in the intermediate data by the blurring processing, and corrects a character area such as text data in the intermediate print data by the edge enhancement processing. As a result, it is possible to automatically switch and perform correction between the appropriate image processing manners corresponding to the receiving result in the receiving of the input of the print quality setting and the data content of the intermediate print data.

Note that, in the above embodiment and the modified embodiment, as the print quality setting, the individual level names are assigned to the plurality of print resolution stages acquired from the printer 200, as they are, and are selected by the user, and it is determined whether to perform the correction of the image processing, corresponding to the selected print quality setting. On the other hand, the image processing itself may also be interpreted as one element of the print quality, and the print quality may be set in various combinations of a plurality of print resolution stages, a correction manner of the image processing, and whether to apply the image processing. Specifically, the capability setting correlation table may be created so that the level name of "HIGH" corresponds to "600 dpi+image processing" and the level name of "NORMAL" corresponds to "600 dpi+no image processing", and may be referred to at the time of the rasterization processing or correction.

Modified Embodiment 2: The Case of Acquiring Bitmap Data from General-Purpose Printing Program In the example of the above embodiment, the rasterization processing that is executed by the auxiliary program 123 is performed only on the intermediate print data in vector format acquired from the general-purpose printing program 122. The present disclosure is not limited thereto. For example, in addition to this, the general-purpose printing program 122 also generates bitmap data in raster format, based on the print quality setting received in advance in ST140, together with the intermediate print data in vector format. The auxiliary program 123, which has acquired both the intermediate print data and the print quality setting, may perform correction on the intermediate print data by using the bitmap data.

Figure 6:
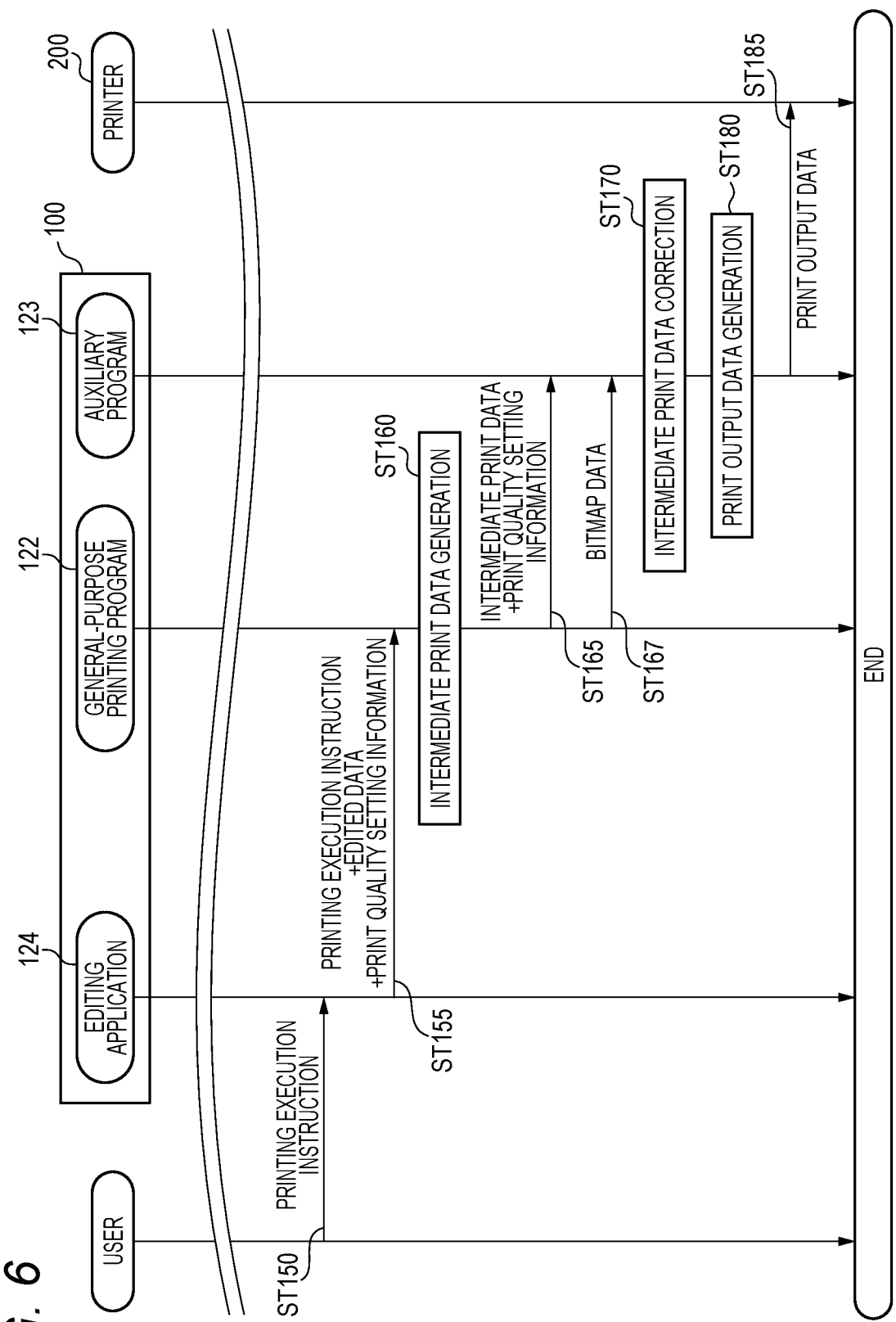
FIG. 6 is a sequence flow when acquiring bitmap data from a general-purpose printing program.

Specifically, as shown in FIG. 6, after transmitting the intermediate print data in vector format to the auxiliary program 123 in ST165, the general-purpose printing program 122 also transmits the bitmap data in raster format based on the print quality setting to the auxiliary program 123 in ST167. Upon receiving this, the auxiliary program 123 performs correction on the intermediate print data by using the received bitmap data in ST170. Note that, the procedure of ST167 is an example of the acquiring of the bitmap data.

In this way, in the present modified embodiment, in the procedure of ST167, the auxiliary program 123 acquires, from the general-purpose printing program 122, the bitmap data corresponding to the data resolution notified by the procedure of ST140, and corrects the intermediate print data by using the bitmap data in the procedure of ST170. Thereby, when converting the intermediate print data in vector format to the raster format in the data correction in the procedure of ST170, the correction using the bitmap data corresponding to the data resolution can also be performed, so that the print quality can be further improved.

Modified Embodiment 3: The Case of Reflecting Processability Capability Information of General-Purpose Printing Program In the example of the above embodiment, the print quality setting by the auxiliary program 123 is set to the content selected by the user from the printing capability information acquired from the printer 200. However, the present disclosure is not limited thereto. For example, the print quality setting that reflects processability capability information indicating a capability allowed to be handled in the general-purpose printing program 122 can be further set.

More specifically, as shown in FIG. 7, after acquiring the printing capability information from the printer 200 in the procedures of ST5 and ST10, the auxiliary program 123 requests processability capability information from the general-purpose printing program 122 in the procedure of ST15, and acquires the processability capability information sent back from the general-purpose printing program 122 in the procedure of ST20. Then, the auxiliary program 123 converts the printing capability information to the processability capability information in the procedure of ST20, and then receives the print quality setting corresponding to the processability capability information from the user in the procedure of ST135. Note that, the procedure of ST20 is an example of the converting of the printing capability information.

In this way, in the present modified embodiment, the auxiliary program 123 converts the printing capability information to the processability capability information indicating a capability allowed to be handled in the general-purpose printing program 122 in the procedure of ST20, and receives the input of the print quality setting corresponding to the processability capability information in the procedure of ST135. Thereby, the auxiliary program 123 can convert the printing capability information of the printer 200 so as to reflect the processability capability information of the general-purpose printing program 122, and the user can input the print quality setting corresponding to both the printing capability information and the processability capability information in the procedure of ST135.

In addition, the sequences shown in FIGS. 4, 6, 7 and the like do not limit the present disclosure to the procedures shown in the sequences. For example, the procedure may be added, deleted or changed without departing from the gist and technical spirit of the present disclosure.

Further, in addition to the above, the methods by the above embodiment and each of the modified embodiments may be combined for use as appropriate.

In addition, although not specifically exemplified, the present disclosure is put into practice with various changes within a range not departing from the gist of the present disclosure.

What is claimed is:

1. A non-transitory computer-readable storage medium storing a support program executable by a computer of an information processing apparatus and used for printing using a printer connected to the information processing apparatus, the support program comprising instructions that, when executed by the computer, cause the computer to perform:
    acquiring, from the printer, printing capability information of the printer;
    displaying a print quality setting corresponding to the printing capability information on a display unit of the information processing apparatus;
    receiving an input of a print quality setting corresponding to the printing capability information, the input of the print quality setting corresponding to the display on the display unit;
    notifying a general-purpose printing program of a receiving result in the receiving of the input of the print quality setting;
    determining a corresponding data correction manner, based on a receiving result in the receiving of the input of the print quality setting;
    acquiring intermediate print data generated by the general-purpose printing program incorporated in an operating system of the information processing apparatus, the intermediate print data corresponding to the receiving result;
    correcting the intermediate print data based on the data correction manner to make corrected intermediate print data;
    generating, using the corrected intermediate print data, print output data to be output to the printer based on the data correction manner; and
    outputting the print output data to be transmitted from the information processing apparatus to the printer as a destination.

2. The non-transitory computer-readable storage medium according to claim 1,
    wherein the computer comprises a storage unit in which at least one correlation between the printing capability information and the print quality setting received in the receiving of the input of the print quality setting is capable of being stored, and
    wherein in the determining of the corresponding data correction manner, the corresponding data correction manner is determined with respect to the receiving result in the receiving of the input of the print quality setting, with reference to the correlation stored in the storage unit.

3. The non-transitory computer-readable storage medium according to claim 1,
    wherein the printing capability information is print resolution information of the printer,
    wherein in the determining of the corresponding data correction manner, a data resolution corresponding to the print resolution information is determined as the data correction manner, based on the receiving result in the receiving of the input of the print quality setting,
    wherein the intermediate print data is generated in vector format, the receiving result being notified in the notifying of the receiving result to the general-purpose printing program, and
    wherein in the correcting of the intermediate print data, the intermediate print data in the vector format is converted to a raster format with correcting the intermediate print data with a print resolution corresponding to the data resolution, to make the corrected intermediate print data.

4. The non-transitory computer-readable storage medium according to claim 3,
    wherein in the determining of the corresponding data correction manner, an image processing manner corresponding to the receiving result in the receiving of the input of the print quality setting is determined as the data correction manner.

5. The non-transitory computer-readable storage medium according to claim 4,
    wherein in the determining of the corresponding data correction manner,
        blurring processing is determined as the image processing manner for an image area in the intermediate print data, and
        edge enhancement processing is determined as the image processing manner for a character area in the intermediate print data.

6. The non-transitory computer-readable storage medium according to claim 3,
    wherein the intermediate print data acquired in the acquiring of the intermediate print data is data generated by executing the general-purpose printing program to cause the computer to convert the intermediate print data to the vector format from edited data edited by a predetermined editing application incorporated in the operating system of the information processing apparatus.

7. The non-transitory computer-readable storage medium according to claim 3,
    wherein the support program further comprises instructions that, when executed by the computer, cause the computer to perform:
        acquiring, from the general-purpose printing program, bitmap data corresponding to the data resolution notified in the notifying of the receiving result, and wherein in the correcting of the intermediate print data, the intermediate print data is corrected using the bitmap data.

8. A printing system comprising:

a printer; and an information processing apparatus having a controller and a communication interface that communicates with the printer, wherein the controller of the information processing apparatus is configured to be executable with an instruction which causes the information processing apparatus to transmit a printing capability information request for requesting printing capability information of the printer to the printer, wherein the printer is configured to be executable with an instruction which causes the printer to transmit the printing capability information of the printer to the information processing apparatus, in response to the printing capability information request, and wherein the controller of the information processing apparatus is configured to be further executable with instructions which cause the information processing apparatus to perform:

receiving and acquiring the printing capability information transmitted from the printer;

displaying a print quality setting corresponding to the printing capability information on a display unit of the information processing apparatus;

receiving an input of a print quality setting corresponding to the printing capability information, the input of the print quality setting corresponding to the display on the display unit;

notifying a general-purpose printing program of a receiving result in the receiving of the input of the print quality setting;

determining a corresponding data correction manner, based on a receiving result in the receiving of the input of the print quality setting;

acquiring intermediate print data generated by the general-purpose printing program incorporated in an operating system of the information processing apparatus the intermediate print data corresponding to the receiving result;

correcting the intermediate print data based on the data correction manner to make corrected intermediate print data;

generating, using the corrected intermediate print data, print output data to be output to the printer based on the data correction manner; and transmitting the print output data to the printer.

* * * * *